H. M. BLOHM.
CROSS-CUT SAWING-MACHINE.

No. 186,790. Patented Jan. 30, 1877.

WITNESSES:
Chas. Nidd
J. H. Scarborough

INVENTOR:
H. M. Blohm
BY Munn & Co
ATTORNEYS.

UNITED STATES PATENT OFFICE.

HEINRICH M. BLOHM, OF NEW YORK, N. Y., ASSIGNOR TO HIMSELF AND JOHANN ERLENWEIN, OF SAME PLACE.

IMPROVEMENT IN CROSSCUT-SAWING MACHINES.

Specification forming part of Letters Patent No. 186,790, dated January 30, 1877; application filed January 6, 1877.

*To all whom it may concern:*

Figure 1:
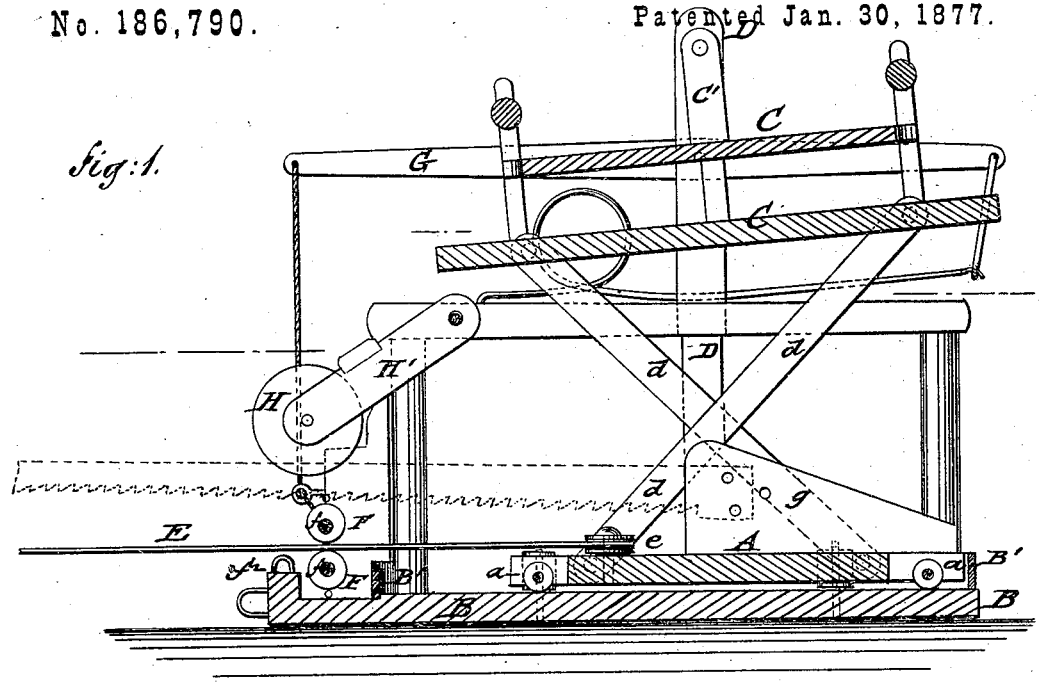
Figure 2:
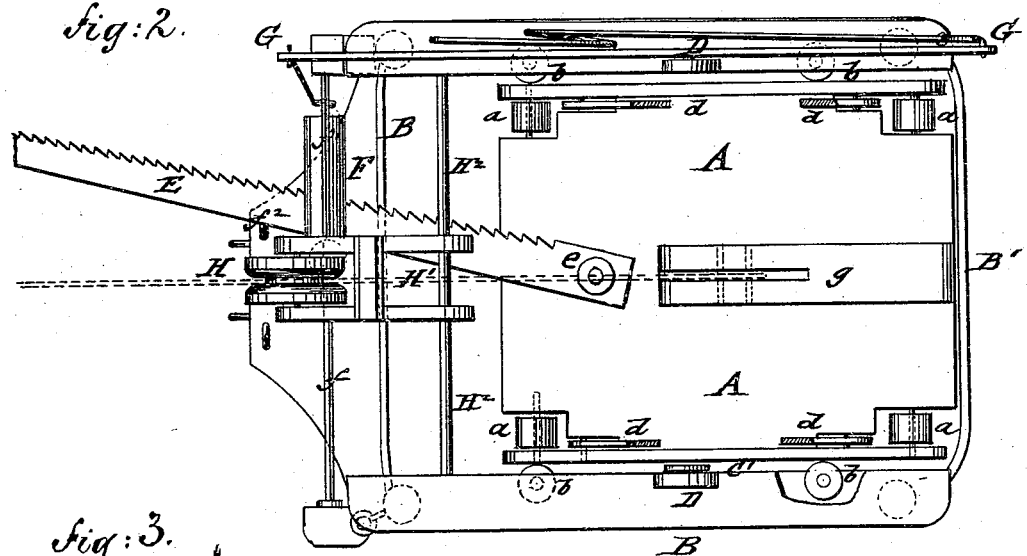
Figure 3:
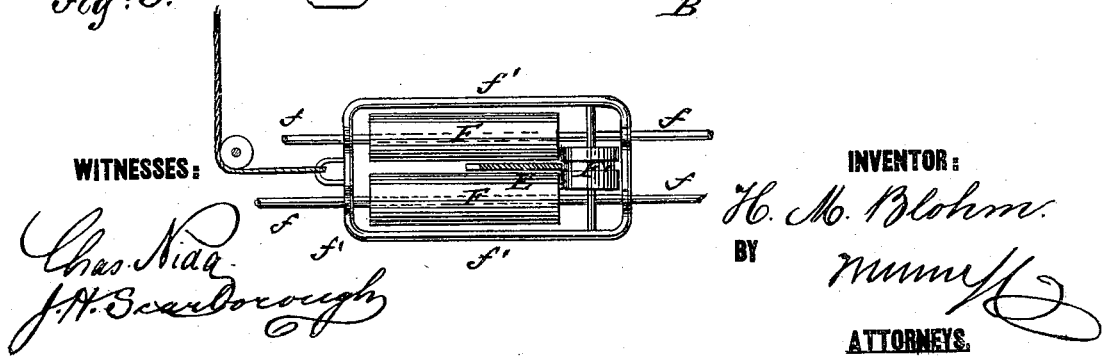

Be it known that, I, HEINRICH M. BLOHM, of the city, county, and State of New York, have invented an Improvement in Crosscut-Sawing Machines, of which the following is a specification:

In the accompanying drawing, Figure 1 represents a vertical longitudinal section of my improved crosscut-sawing machine; Fig. 2, a plan view of the same, and Fig. 3 a detail front view of the spring guide-rollers.

Similar letters of reference indicate corresponding parts.

The invention relates to an improved crosscut-sawing machine, that may be worked with great facility by one person, so as to be applied for the cutting of trees, sawing of the trunks into pieces, &c., the machine being carried readily from place to place, and very economical in use, as it accomplishes the work with less labor and expense.

The invention consists of a reciprocating saw-carriage, to which motion is imparted by a rocking-seat arrangement, the saw being guided in horizontal or vertical position and fed to the work by spring-acted roller attachments.

In the drawing, A represents a saw-carriage, that is placed on rollers $a$, and reciprocated on a supporting base-frame, B, which may be placed on wheels to be carried to the place of work. The carriage A is guided between vertical rollers $b$ of frame B, and the extent of motion to either side of its transverse axis defined by lateral cushioning-bands B'.

The carriage is connected, by pivoted cross-levers $d$, with an oscillating seat, C, which is hung by fixed center posts C' to uprights D, that are supported firmly and rigidly on frame B. The seat C is oscillated by the rocking motion imparted to it by the person who sits thereon and takes hold of the side handles of the seat, so as to work the saw by the weight of the body being alternately thrown to one side or the other of the seat. The saw-carriage is thereby reciprocated in easy manner, with but little effort and fatigue, and the saw worked by one person merely, who is thereby enabled to accomplish the sawing in quick and effective manner.

For sawing off a tree, the saw-blade E is secured in horizontal position to the carriage by a pivot and washers, $e$. The saw is guided between horizontal rollers F, that slide on parallel lateral rods $f$, and is fed forward by means of a grooved roller, F', that presses on the back of the saw, the roller F' being guided along the rods $f$ by a suitable frame, $f^1$, which connects, by rope-and-pulley attachment, with the end of a spring-acted lever, G, fulcrumed to the upright at the side of the carriage. The saw cuts thereby through the tree or other objects, having the additional advantage of cutting close to the ground, and economizing the stumps that remain at present standing above ground.

For sawing off the branches, cutting the trunk into several pieces, &c., the saw has to be placed into vertical position on the carriage. This is accomplished by detaching the horizontal guide rollers and rods, and applying the saw to a stirrup, $g$, of the carriage. A grooved top roller, H, turns in a swinging frame, $H^1$, that is rigidly attached to a lateral rod, $H^2$, the roller being firmly pressed down on the back of the saw by a rope connected to the spring-acted lever G, the rope being first passed through a front pulley or staple, $f^2$, of frame B, and then through a side pulley to the end of the lever, which arrangement is clearly shown in Figs. 1 and 2. The machine is thus adapted to saw with equal facility in horizontal and vertical direction, and furnishes a cheap, economical, and convenient saw for farmers, gardeners, and others, for clearing land, cutting trees, and for other purposes.

Having thus described my invention, I claim as new and desire to secure by Letters Patent—

1. A crosscut-sawing machine constructed of a vertically or horizontally guiding and advancing saw, a reciprocating saw-carriage, and a rocking seat, operated substantially in the manner and for the purpose described.

2. The combination of supporting-frame B, having lateral cushioning-bands and guide-rollers, with the reciprocating saw-carriage, substantially as set forth.

3. The combination of the reciprocating saw-carriage A, pivoted cross-levers *d*, rocking seat C, and uprights B, substantially as specified.

4. The combination of the horizontally-swinging saw with horizontally-sliding guide-rollers and a spring-acted feed-roller, substantially as shown and described.

5. The combination of the vertically swinging and guided saw with a suspended and spring-acted feed-roller, substantially as set forth.

HEINRICH M. BLOHM.

Witnesses:
PAUL GOEPEL,
C. SEDGWICK.